US012163972B2

(12) United States Patent
Shiohata et al.

(10) Patent No.: US 12,163,972 B2
(45) Date of Patent: Dec. 10, 2024

(54) AUTOMATED ANALYSIS DEVICE, AND ABNORMALITY DETECTING METHOD

(71) Applicant: Hitachi High-Tech Corporation, Tokyo (JP)

(72) Inventors: Hirobumi Shiohata, Tokyo (JP); Yuichiro Ota, Tokyo (JP); Takaaki Hagiwara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 457 days.

(21) Appl. No.: 17/596,014

(22) PCT Filed: Mar. 3, 2020

(86) PCT No.: PCT/JP2020/008937
§ 371 (c)(1),
(2) Date: Dec. 1, 2021

(87) PCT Pub. No.: WO2020/250507
PCT Pub. Date: Dec. 17, 2020

(65) Prior Publication Data
US 2022/0221477 A1 Jul. 14, 2022

(30) Foreign Application Priority Data
Jun. 11, 2019 (JP) ................ 2019-109032

(51) Int. Cl.
*G01N 35/10* (2006.01)
*G01N 35/00* (2006.01)
*G01N 35/04* (2006.01)

(52) U.S. Cl.
CPC ........... *G01N 35/1002* (2013.01); *G01N 2035/00891* (2013.01); *G01N 2035/0494* (2013.01)

(58) Field of Classification Search
CPC ..... G01N 35/1002; G01N 2035/00891; G01N 2035/0494; G01N 2035/1018;
(Continued)

(56) References Cited

U.S. PATENT DOCUMENTS

| 2004/0101440 A1 | 5/2004 | Ishizawa et al. |
| 2006/0039824 A1* | 2/2006 | Onuma ............... B01L 3/021 422/63 |

(Continued)

FOREIGN PATENT DOCUMENTS

| EP | 2 093 573 A2 | 8/2009 |
| EP | 2 221 622 A2 | 8/2010 |

(Continued)

OTHER PUBLICATIONS

International Search Report (PCT/ISA/210) issued in PCT Application No. PCT/JP2020/008937 dated Jun. 9, 2020 with English translation (five (5) pages).

(Continued)

*Primary Examiner* — Eman A Alkafawi
*Assistant Examiner* — Dilara Sultana
(74) *Attorney, Agent, or Firm* — Crowell & Moring LLP

(57) ABSTRACT

Proposed is a technique for facilitating work of cause investigation of a defect by an operator. The present disclosure proposes an automatic analyzer including: a reagent dispensing unit configured to aspirate a reagent from a reagent vessel that contains the reagent, and discharge the reagent into a reaction vessel that contains a reaction liquid containing a sample; a storage unit configured to store a type of the sample and concentration-related information determined for each type of the sample and related to a concentration of a component to be measured contained in the sample; a detection unit configured to detect a measurement concentration that is the concentration of the component to (Continued)

be measured contained in the reaction liquid; and a determination unit configured to determine whether an abnormality occurs in the reagent vessel based on the concentration-related information and the measurement concentration.

13 Claims, 10 Drawing Sheets

(58) Field of Classification Search
CPC ......... G01N 2035/00; G01N 35/00663; G01N 2035/00673; G01N 35/10; G01N 35/04
See application file for complete search history.

(56) References Cited

U.S. PATENT DOCUMENTS

| | | |
|---|---|---|
| 2013/0122596 A1 | 5/2013 | Kamihara et al. |
| 2013/0132022 A1* | 5/2013 | Tamura ............... G06F 17/00 |
| | | 702/104 |
| 2014/0356964 A1* | 12/2014 | Makino ............... G01N 21/532 |
| | | 422/82.05 |
| 2015/0044096 A1 | 2/2015 | Nakasawa et al. |
| 2018/0003728 A1* | 1/2018 | Satou ............... G01B 11/0608 |
| 2018/0031589 A1* | 2/2018 | Tamezane .......... G01N 35/1016 |

FOREIGN PATENT DOCUMENTS

| | | | |
|---|---|---|---|
| JP | 2004-170279 A | | 6/2004 |
| JP | 2007-303937 A | | 11/2007 |
| JP | 2013-217741 A | | 10/2013 |
| JP | 2016-57228 A | | 4/2016 |
| JP | 2016057228 A | * | 4/2016 |

OTHER PUBLICATIONS

Japanese-language Written Opinion (PCT/ISA/237) issued in PCT Application No. PCT/JP2020/008937 dated Jun. 9, 2020 (three (3) pages).
Extended European Search Report issued in European Application No. 20823579.6 dated Apr. 12, 2023 (11 pages).

* cited by examiner

| Measurement time | Sample | Reagent vessel | Measurement item | Measurement concentration | Bubble influence |
|---|---|---|---|---|---|
| 2018/ 1/ 4 10:00 | Control sample x | Reagent vessel X | XXX | 98 | - |
| 2019/ 1/ 1 10:00 | Control sample a | Reagent vessel A | AAA | 51 | - |
| 2019/ 1/ 2 11:00 | Control sample b | Reagent vessel B | BBB | 99 | - |
| 2019/ 1/ 3 12:00 | Control sample c | Reagent vessel C | CCC | 71 | - |
| 2019/ 1/ 3 15:00 | Control sample d | Reagent vessel D | DDD | 201 | YES |
| 2019/ 1/ 4 13:00 | Control sample x | Reagent vessel X | XXX | 20 | - |

FIG. 11

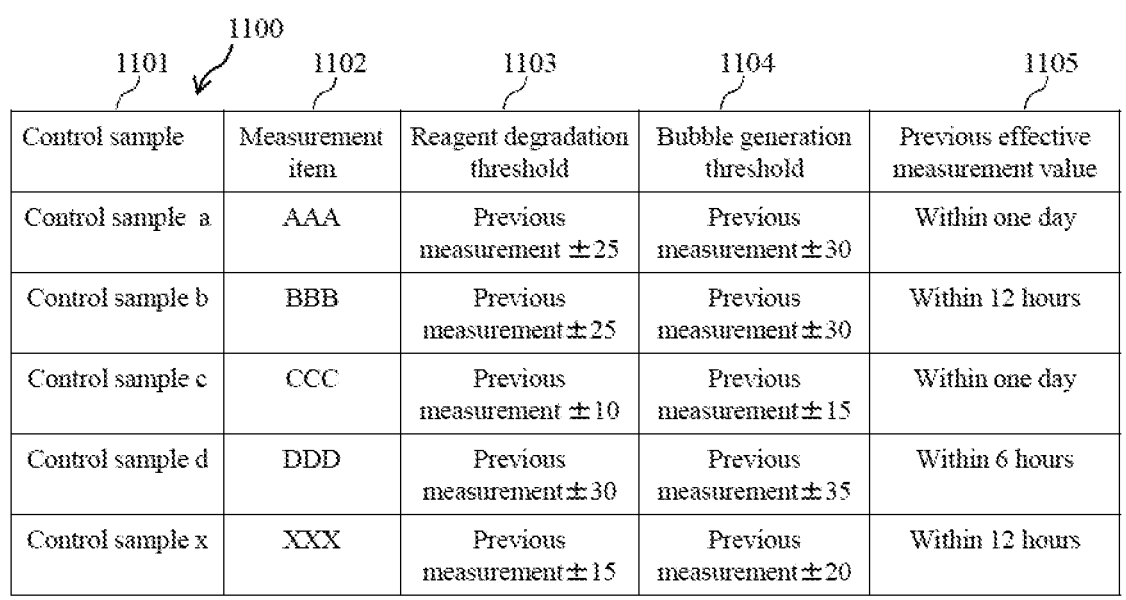

| Control sample | Measurement item | Reagent degradation threshold | Bubble generation threshold | Previous effective measurement value |
|---|---|---|---|---|
| Control sample a | AAA | Previous measurement ±25 | Previous measurement ±30 | Within one day |
| Control sample b | BBB | Previous measurement ±25 | Previous measurement ±30 | Within 12 hours |
| Control sample c | CCC | Previous measurement ±10 | Previous measurement ±15 | Within one day |
| Control sample d | DDD | Previous measurement ±30 | Previous measurement ±35 | Within 6 hours |
| Control sample x | XXX | Previous measurement ±15 | Previous measurement ±20 | Within 12 hours |

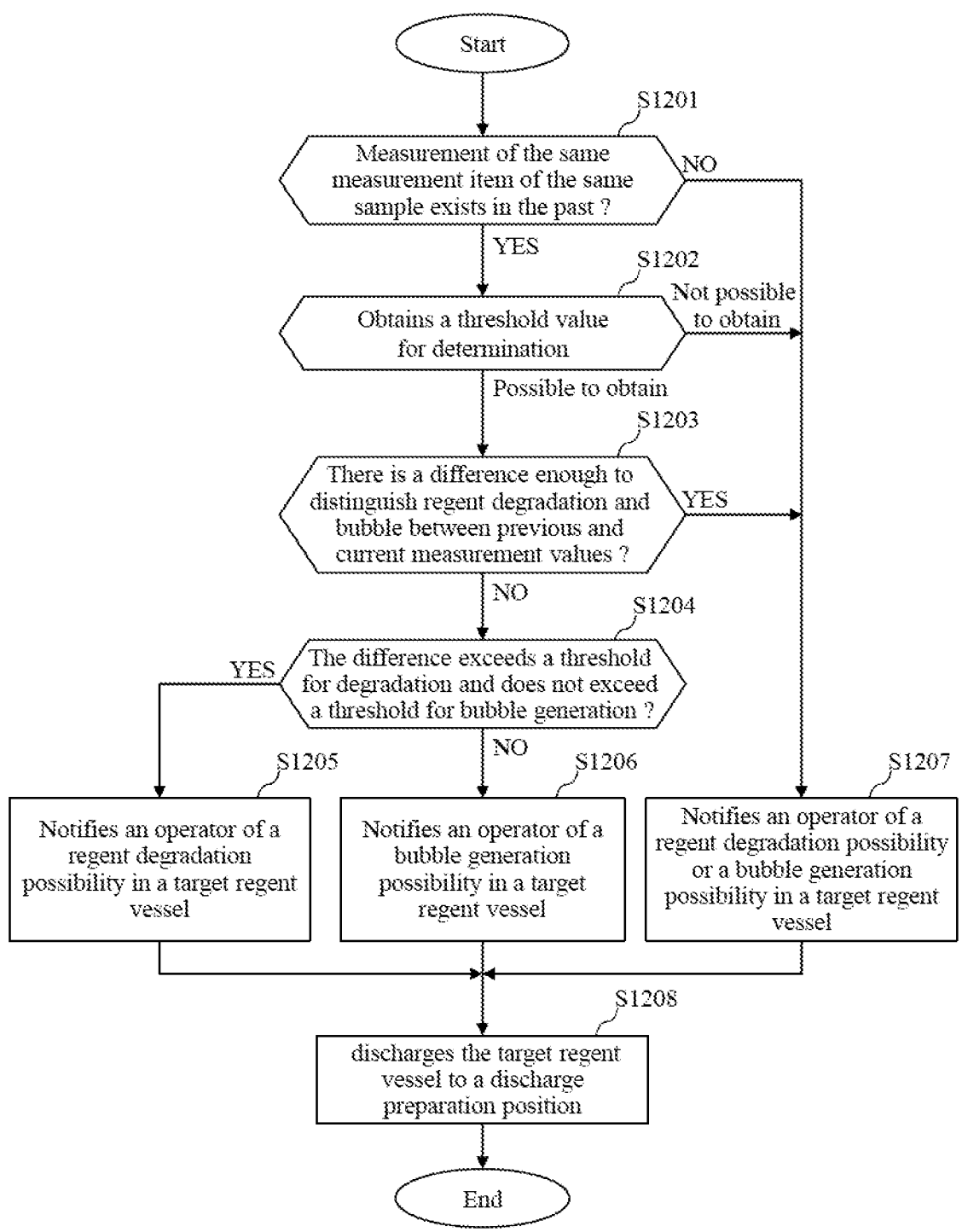

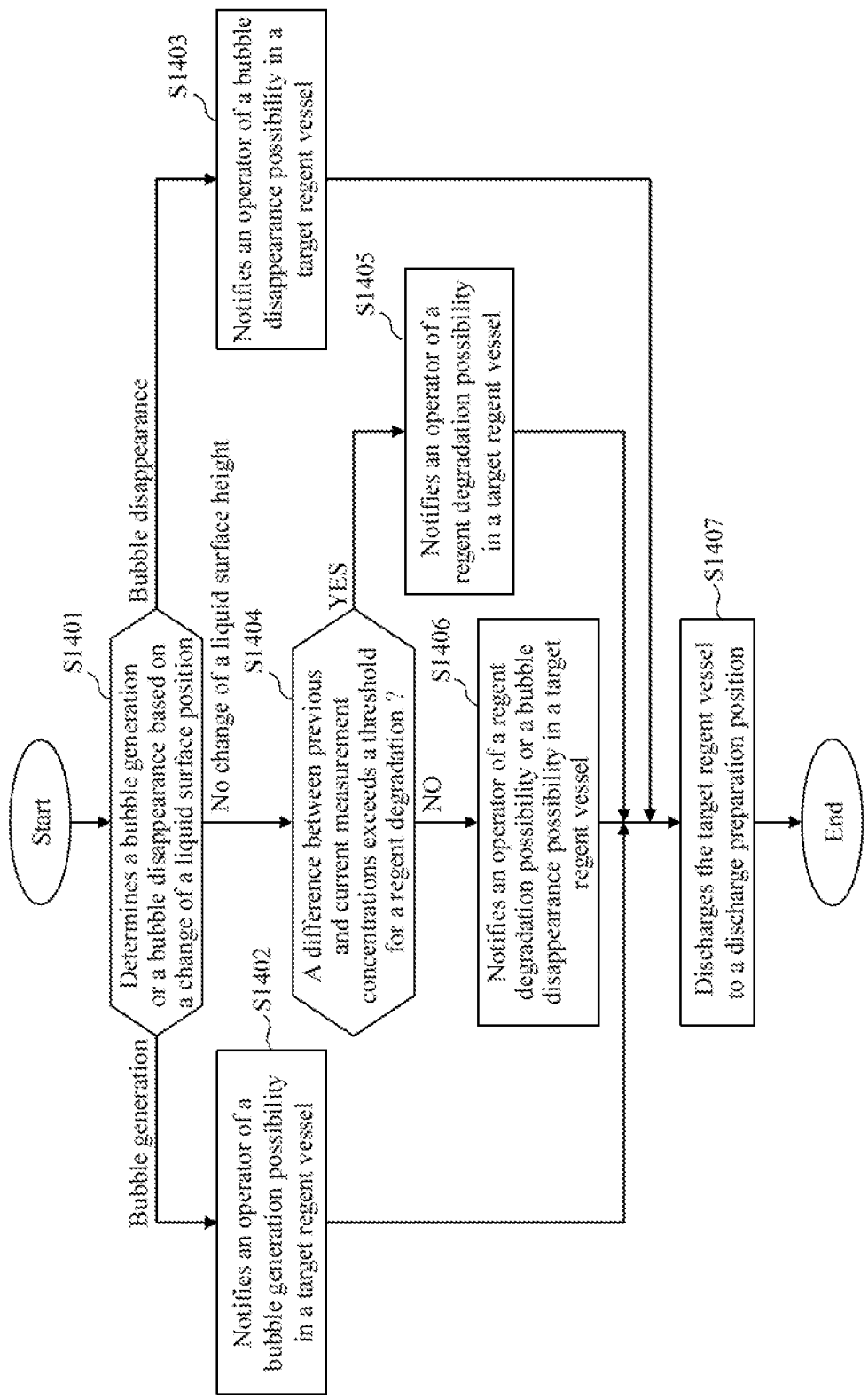

AUTOMATED ANALYSIS DEVICE, AND ABNORMALITY DETECTING METHOD

TECHNICAL FIELD

This disclosure relates to an automatic analyzer and an abnormality detection method.

BACKGROUND ART

In an automatic analyzer for performing analysis of a biological sample such as blood or urine, the analysis is performed by using reagents different in each item to be analyzed. These reagents are contained in each reagent vessel for each prescribed amount in every type of the reagents and generally mounted in a reagent storage of the automatic analyzer.

In the automatic analyzer, a quality control is performed to confirm that the analysis performance of the device is normal. In the quality control, a quality control substance (control sample) is measured at predetermined intervals or at the intervals of a predetermined sample number during the measurement period of a patient sample, and it is determined whether the measurement result is within a control range related to the control sample, or whether the accuracy is within the range with a circadian change and a daily difference variation considered.

When the measurement result of the quality control is out of the range, an operator investigates the cause according to the state of the automatic analyzer, a reagent, and a sample. There are various causes such as dirt of the automatic analyzer, a bubble in a reagent vessel, a bubble of a sample, and the like. When determining that some problem has occurred in a reagent vessel, an operator has to discharge the relevant reagent vessel from the automatic analyzer to investigate the above vessel.

As a technique for detecting the cause of the problem generated in a reagent vessel, for example, there is a bubble detection in the reagent vessel. As the technique for detecting a bubble in a reagent vessel, there is a method of detecting a bubble from a change in the liquid surface (for example, refer to Patent Literature 1). Further, there are a method of detecting a bubble from a moving amount at a dispensation time of a reagent probe and a method of recording a shift of the liquid surface height from the initial dispensation (for example, refer to Patent Literature 2).

CITATION LIST

Patent Literature

Patent Literature 1: Japanese Patent No. 2007-303937
Patent Literature 2: Japanese Patent No. 2004-170279

SUMMARY OF INVENTION

Technical Problem

When a problem has occurred in the quality control, it is necessary to detect whether a reagent has a problem (for example, a bubble generation or a reagent degradation) and discharge the corresponding reagent vessel, to facilitate an operator's cause investigation work. Further, it is necessary to avoid degradation caused by a temperature change of the reagent discharged as a result of the bubble detection.

When a bubble of a reagent vessel has continued to leave there from the previous dispensation, however, since there occurs no change in the liquid surface height, the above-mentioned method of detecting a bubble from the liquid surface height at the dispensation time may not detect the bubble. Therefore, also at the dispensation time and the later, an operator has to keep confirming a bubble generation and excluding a doubtful reagent has to be excluded.

Taking this situation into consideration, this disclosure provides a technique for facilitating an operator's work of investigating the cause of a problem.

Solution to Problem

In order to solve the above problems, this disclosure proposes an automatic analyzer including: a reagent dispensing unit configured to aspirate a reagent from a reagent vessel that contains the reagent and discharge the reagent into a reaction vessel that contains a reaction liquid containing a sample; a storage unit configured to store a type of the sample and concentration-related information determined for each type of the sample and related to a concentration of a component to be measured contained in the sample; a detection unit configured to detect a measurement concentration that is a concentration of the component to be measured contained in the reaction liquid; and a determination unit configured to determine whether an abnormality occurs in the reagent vessel based on the concentration-related information and the measurement concentration.

Further features related to this disclosure are to be apparent from this description and the attached drawings. Further, the modes of the disclosure are achieved and realized by the components and a combination of various components, the subsequent detailed description, and the scope of the attached claims.

It is necessary to understand that this description is only a typical example and that it is not to limit the scope of the claims or application example in any sense.

Advantageous Effects of Invention

According to the technique of this disclosure, an operator can facilitate the work of investigating the cause of a problem in the automatic analyzer.

BRIEF DESCRIPTION OF DRAWINGS

FIG. 11 is a view showing a configuration example of an in-reagent vessel cause threshold table for storing a reagent degradation threshold and a bubble generation threshold which are assigned to the respective sets of the control samples and the measurement items.

FIG. 12 is a flow chart for describing details of the processing, as for a reagent vessel determined to have an abnormality, for determining whether the abnormality is caused by the bubble within the reagent vessel or the reagent degradation.

FIG. 14 is a flow chart for describing the processing in which a mechanism for detecting a bubble according to a change of the reagent liquid surface height and a mechanism for determining the reagent degradation from the reagent degradation threshold are combined together.

DESCRIPTION OF EMBODIMENTS

An embodiment of this disclosure will be hereinafter described with reference to the attached drawings. In the attached drawings, the same functional components may be shown with the same numbers. Although the attached drawings show the specified embodiment and exemplary implementation according to the principle of this disclosure, these are not used to interpret the disclosure restrictively but used for easily understanding the above.

The embodiment is described in details enough for those skilled in the art to carry out the disclosure; however, it has to be understood that other implementation and forms are possible and that a change of configuration and structure and various replacement of the components are also possible without departing from the scope and the spirit of the technical spirit of the disclosure. In short, the following description shall not be interpreted restrictively.

Further, the embodiment of the disclosure may be installed by software operating on a general computer or may be installed by exclusive hardware or by a combination of software and hardware.

Here, in the following description, although each information of the disclosure is described in a form of "table", the information is not necessarily expressed in a data structure by the table, but may be expressed in the data structure such as list, DB, and queue or the other. Then, the "table", "list", "DB", and "queue" are occasionally referred to as "information" simply, to show that it does not depend on the data structure.

Configuration Example of Whole Automatic Analyzer

Figure 1:
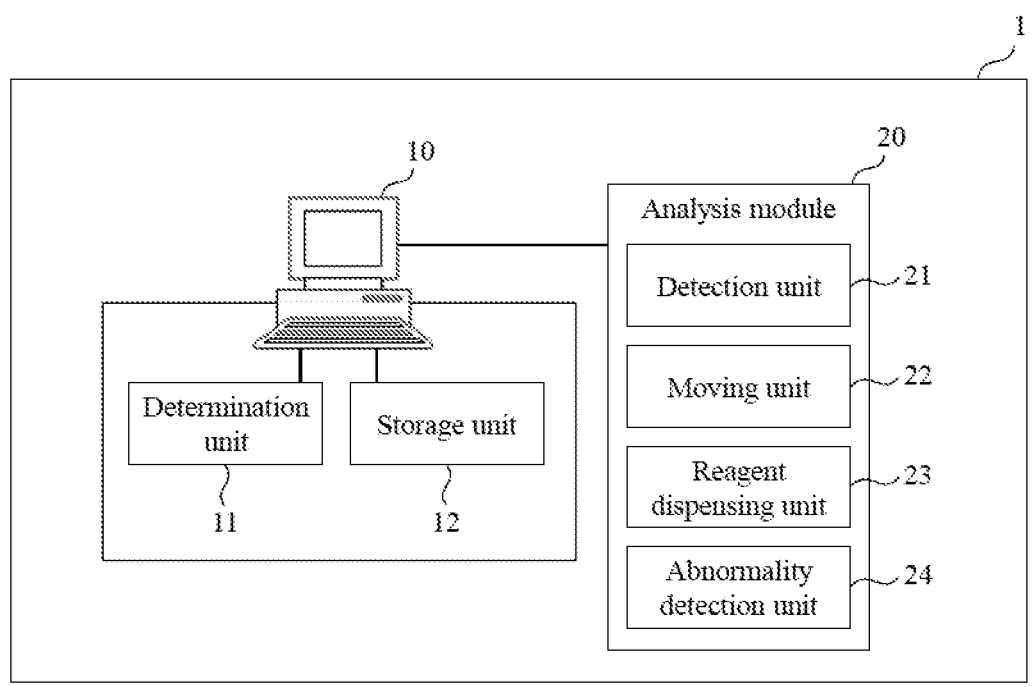
FIG. 1 is a block diagram showing an overall configuration of an automatic analyzer.

FIG. 1 is a system block diagram showing an overall configuration example of an automatic analyzer 1.

The automatic analyzer 1 includes an overall management computer 10 and an analysis module 20. The overall management computer 10 includes the components of a general computer; for example, a processor, a memory and a storage, a communication unit, a display (display unit), and an input unit. For example, a determination unit 11 in FIG. 1 is formed by the processor, and a storage unit 12 is formed by the memory and the storage. The determination unit 11 determines a possibility of bubble generation, and the storage unit 12 stores the information (the contents of the tables in FIGS. 4 to 6 described later) related to the measurement concentration received from the analysis module 20.

The analysis module 20 includes a detection unit 21 that detects the measurement concentration, a moving unit 22 that moves a reagent vessel, a reagent dispensing unit 23 that aspirates a reagent contained in a reagent vessel and discharges the reagent into a reaction vessel for creating a reaction liquid including the reagent and a sample, and an abnormality detection unit 24 that detects an abnormality of the analysis module. The abnormality detection unit 24 is provided, for example, within the analysis module 20, including a bubble detection camera for sample 218 (refer to FIG. 2), various sensors for detecting various types of abnormality of mechanical operations, and various types of software for detecting an abnormality in the information processing and an abnormality in the analysis result.

Configuration Example of Analysis Module

Figure 2:
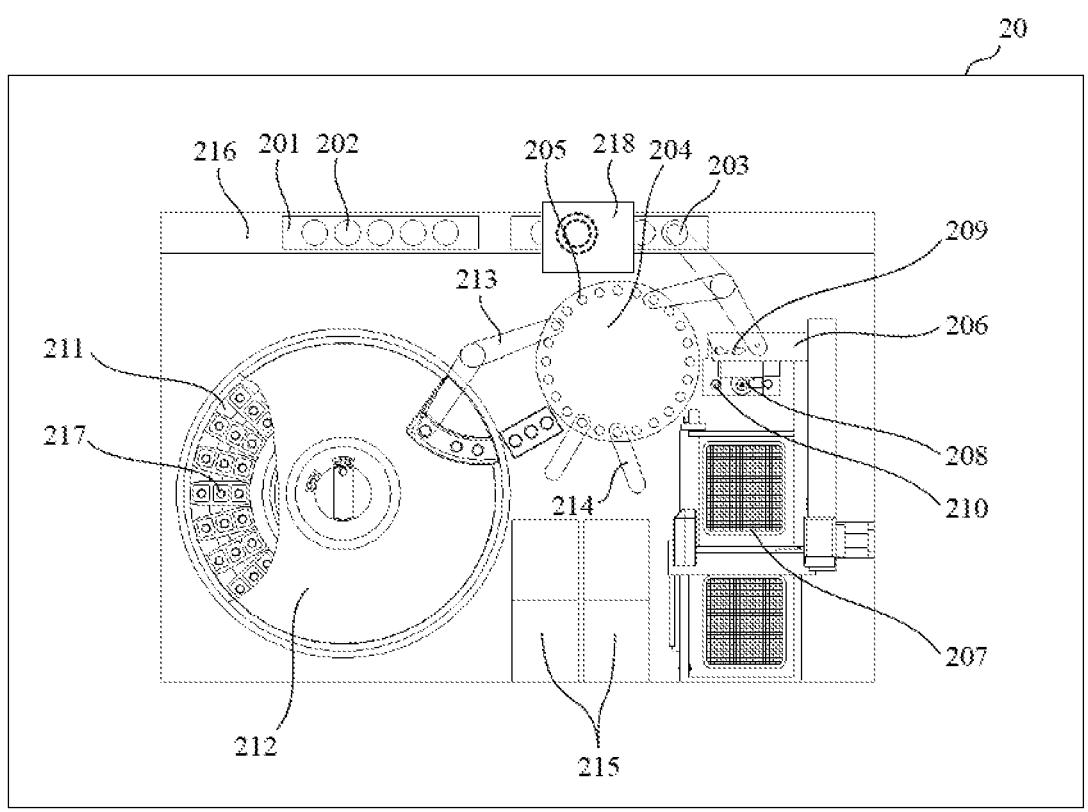
FIG. 2 is a view showing a configuration example of an analysis module.

FIG. 2 is a view showing an overall configuration example of the analysis module 20. The analysis module 20 incudes a transport rack 201, a sample dispensing nozzle 203, an incubator (reaction disk) 204, a sample dispensing tip and reaction vessel transport mechanism 206, a sample dispensing tip and reaction vessel holding member 207, a reaction vessel stirring mechanism 208, a sample dispensing tip and reaction vessel disposal hole 209, a rack transport line 216, a reagent disk 211, a reagent disk cover 212, a reagent dispensing nozzle 213, a reaction solution aspiration nozzle 214, a detection unit 215, a bubble detection camera for sample 218.

A sample vessel 202 for holding a sample is installed in the transport rack 201 of the analysis module 20, and moved to a sample dispensing position near the sample dispensing nozzle 203 along the rack transport line 216. The bubble detection camera for sample 218 is provided above the rack transport line 216. The bubble detection camera for sample 218 confirms whether a bubble occurs or not in a sample, and notifies the overall management computer 10 of the abnormality when confirming the bubble.

A plurality of reaction vessels 205 can be set in the incubator 204, which can rotationally move to shift the reaction vessels 205 set in a circumferential direction to each predetermined position.

The sample dispensing tip and reaction vessel transport mechanism 206 can move in three directions of an X axis, a Y axis, and a Z axis, in each predetermined range of the sample dispensing tip and reaction vessel holding member 207, the reaction vessel stirring mechanism 208, the sample dispensing tip and reaction vessel disposal hole 209, a sample dispensing tip mounting position 210, and the incubator 204, to transport the sample dispensing tip and the reaction vessel.

The sample dispensing tip and reaction vessel holding member 207 is provided with a plurality of unused reaction vessels and sample dispensing tips. The sample dispensing tip and reaction vessel transport mechanism 206 moves to above the sample dispensing tip and reaction vessel holding member 207, getting down to hold an unused reaction vessel and up, and moves to above a predetermined position of the incubator 204, getting down to set the reaction vessel.

Next, the sample dispensing tip and reaction vessel transport mechanism 206 moves to above the sample dispensing tip and reaction vessel holding member 207, then getting down there to hold an unused sample dispensing tip and up, and moves to above the sample dispensing tip mounting position 210, then getting down to set the sample dispensing tip there.

The sample dispensing nozzle 203 can rotate and move vertically; after rotating to above the sample dispensing tip mounting position 210, the above nozzle gets down, where a sample dispensing tip is inserted and fitted into the distal end of the sample dispensing nozzle 203. The sample dispensing nozzle 203 with the sample dispensing tip fitted there moves to above the sample vessel 202 mounted in the transport rack 201, then gets down, and aspirates a predetermined amount of the sample held in the sample vessel 202. Aspirating the sample, the sample dispensing nozzle 203 moves to above the incubator 204, then gets down, and discharges the sample to an unused reaction vessel 205 held in the incubator 204. After finishing the sample discharge, the sample dispensing nozzle 203 moves to above the sample dispensing tip and reaction vessel disposal hole 209 and disposes of the used sample dispensing tip through a disposal hole.

The reagent disk (reagent setting mechanism) 211 is provided with a plurality of reagent vessels 217. The reagent disk cover 212 is provided in the upper portion of the reagent disk 211, to keep the temperature inside the reagent disk 211 at a predetermined temperature. Here, an opening portion (reagent disk cover opening portion) may be provided in a part of the reagent disk cover 212.

The reagent dispensing nozzle 213 can rotate and move vertically; after rotating to above the opening portion of the reagent disk cover 212, it gets down to soak the distal end of the reagent dispensing nozzle 213 in a reagent within a predetermined reagent vessel, and aspirates a predetermined amount of the reagent. In order to lessen the amount of the liquid attached to the outer wall of the nozzle, the reagent dispensing nozzle 213 detects a liquid surface of the liquid within the reagent vessel, stops the down operation of the nozzle at a position where the distal end of the nozzle is a little below the liquid surface, and aspirates a predetermined amount of the reagent. After getting up, the reagent dispensing nozzle 213 rotatively moves to above a predetermined position of the incubator 204 and discharges the reagent to the reaction vessel 205.

The reaction vessel 205 with the discharged sample and reagent moves to a predetermined position by the rotation of the incubator 204, and the sample dispensing tip and reaction vessel transport mechanism 206 carries the above vessel to the reaction vessel stirring mechanism 208. The reaction vessel stirring mechanism 208 stirs and mixes the sample and the reagent within the reaction vessel by supplying the rotation movement to the reaction vessel. The reaction vessel having been stirred is returned to the predetermined position of the incubator 204 according to the sample dispensing tip and reaction vessel transport mechanism 206.

The reaction solution aspiration nozzle 214 can rotate and move vertically; dispenses the sample and the reagent, finishes stirring, moves to above the reaction vessel 205 which has passed a predetermined reaction period in the incubator 204, gets down, and aspirates the reaction liquid within the reaction vessel 205. The reaction liquid aspirated by the reaction solution aspiration nozzle 214 is analyzed in the detection unit 215.

The reaction vessel 205 with the reaction liquid aspirated moves to a predetermined position according to the rotation of the incubator 204, and the sample dispensing tip and reaction vessel transport mechanism 206 moves the above vessel to above the sample dispensing tip and reaction vessel disposal hole 209 and disposes of the above vessel through the disposal hole.

Figures 3, 4:
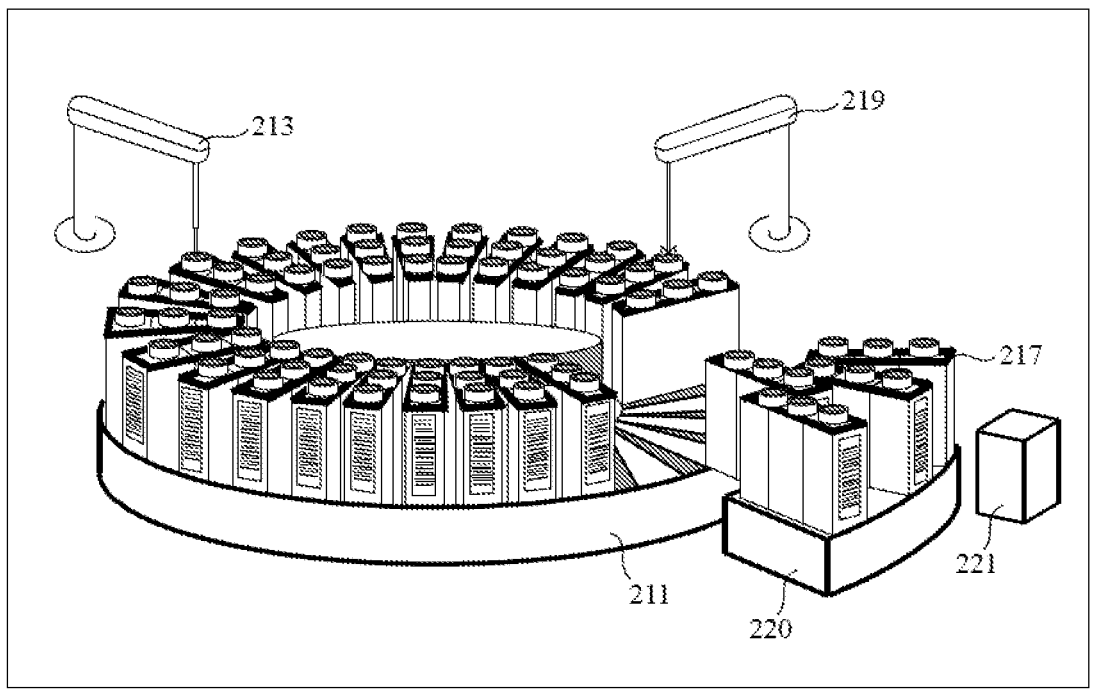
FIG. 3 is a view showing a configuration example of a moving unit in the analysis module.
FIG. 4 is a diagram showing a configuration example of a measurement concentration data table that records measurement concentrations received from a measurement unit.

FIG. 3 is a view showing an overall configuration example of the moving unit 22. The moving unit 22 forms a part of the analysis module 20 and includes a rotational reagent setting mechanism (reagent disk) 211, a reagent dispensing nozzle 213, a reagent stirring mechanism (magnetic particle stirring mechanism) 219, a reagent loader 220, and a reagent information reading mechanism 221. The reagent setting mechanism 211 and the reagent loader 220 are provided with a plurality of reagent vessels 217. A set of three liquid reagent necessary, for example, for one examination item is set within the reagent vessel 217. One of them is a reagent containing magnetic particles. The reagent information reading mechanism 221 is set in adjacent to the reagent loader 220. The reagent information is attached to the reagent vessel 217 and the reagent information on the reagent loader 220 can be obtained by using the reagent information reading mechanism 221.

An operator sets the reagent vessel 217 at a predetermined position of the reagent loader 220 and carries in the reagent. Further, an operator operates the reagent loader 220, using the overall management computer 10, and discharges the reagent vessel 217 to a reagent discharge preparation position of the reagent loader 220. Generally, the reagent loader 220 is refrigerated. cl Configuration Example of Measurement Concentration Data Table FIG. 4 is a view showing a configuration example of a measurement concentration data table 400 that stores concentrations measured by the detection unit 21 of the analysis module 20.

The measurement concentration data table 400 includes a measurement time 401, a sample 402 indicating a type of the measured control sample, information 403 of the reagent vessel used for measurement, a measurement item 404, a measurement concentration 405, and a bubble influence 406, as the component items. Here, in the column of the bubble influence 406, "yes" is stored when the determination unit 11 determines that there is an influence of the bubble.

For example, the measurement concentration data 407 shows that when the control sample d is measured with the reagent of the reagent vessel D with respect to the measurement item DDD, the measurement concentration is 201, indicating that there is the influence of the bubble.

Configuration Example of Control Sample Assignment Information Table

Figure 5:
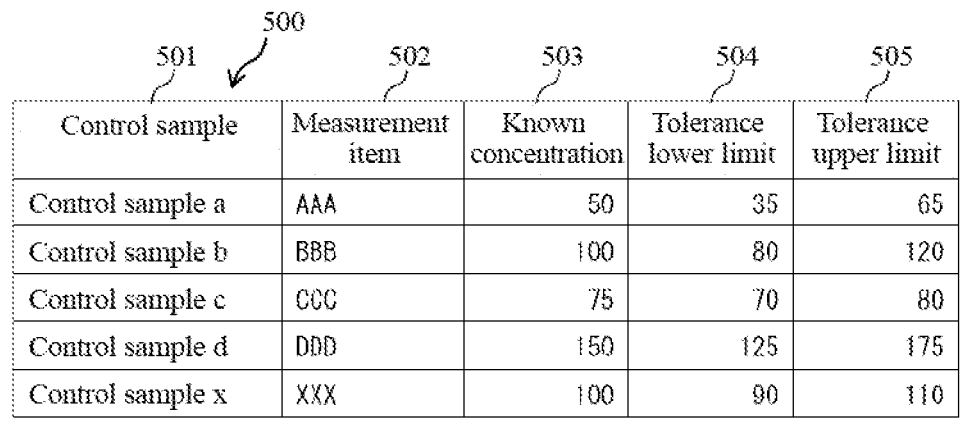
FIG. 5 is a diagram showing a configuration example of a control sample assignment data table that stores information assigned to control samples.

FIG. 5 is a view showing a configuration example of a control sample assignment data table 500 that stores the information assigned to the respective control samples.

The control sample assignment information table 500 includes a control sample 501 indicating a type of the control sample, a measurement item 502, a known concentration 503 indicating a right concentration of the corresponding control sample, a tolerance lower limit 504 of the measured concentration, and a tolerance upper limit 505 of the measured concentration, as the component items.

Quality control processing for measuring the respective control samples at predetermined intervals (for example, once in a day) and confirming the measurement accuracy of the device is performed on the analysis module 20. In this quality control processing, whether the accuracy of the analysis module 20 is normal or not is confirmed by checking whether the measurement result (quality control result) is within a control range. For example, in the quality control processing, when the measurement item AAA of the "control sample a" is measured, the tolerance lower limit 504 is set at "35" and the tolerance upper limit 505 is set at "65". Therefore, when the measurement concentration of the control sample a is in the range of 35 to 65 inclusively, it is determined that the operation of the analysis module 20 is normal; otherwise, it is determined that the above module has some defect.

Configuration Example of Warning Data Table

Figure 6:
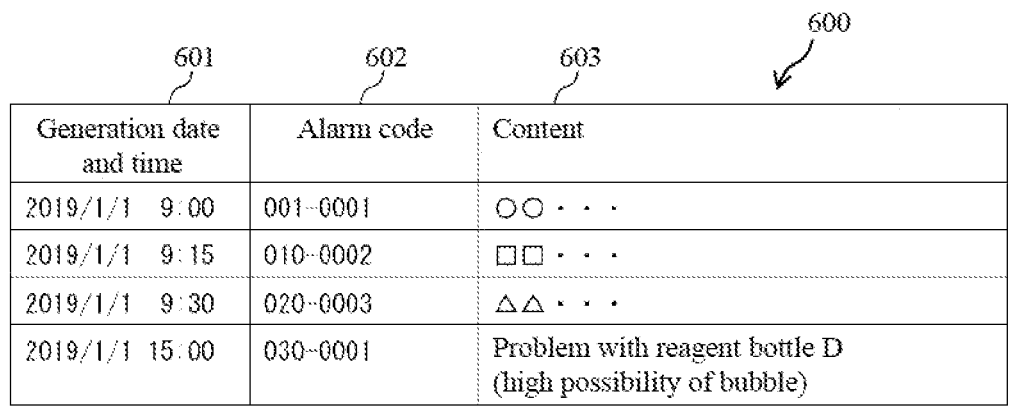
FIG. 6 is a diagram showing a configuration example of a warning data table that stores various abnormality warnings of a device detected by an abnormality detection unit or bubble generation warnings detected by a determination unit.

FIG. 6 is a view showing a configuration example of a warning data table 600 that stores various abnormality warnings (hereinafter, referred to as alarm) of a device detected by the abnormality detection unit 24 (refer to FIG. 1) or bubble generation warnings detected by the determination unit 11.

The warning data table 600 includes a generation date and time 601 of alarm, an alarm code 602, and an alarm content 603, as the component items. Here, the alarm includes, for example, an abnormality in the information processing, an abnormality in the mechanical operation, an abnormality in the analysis result, and the like.

Details of Quality Control Processing

Figure 7:
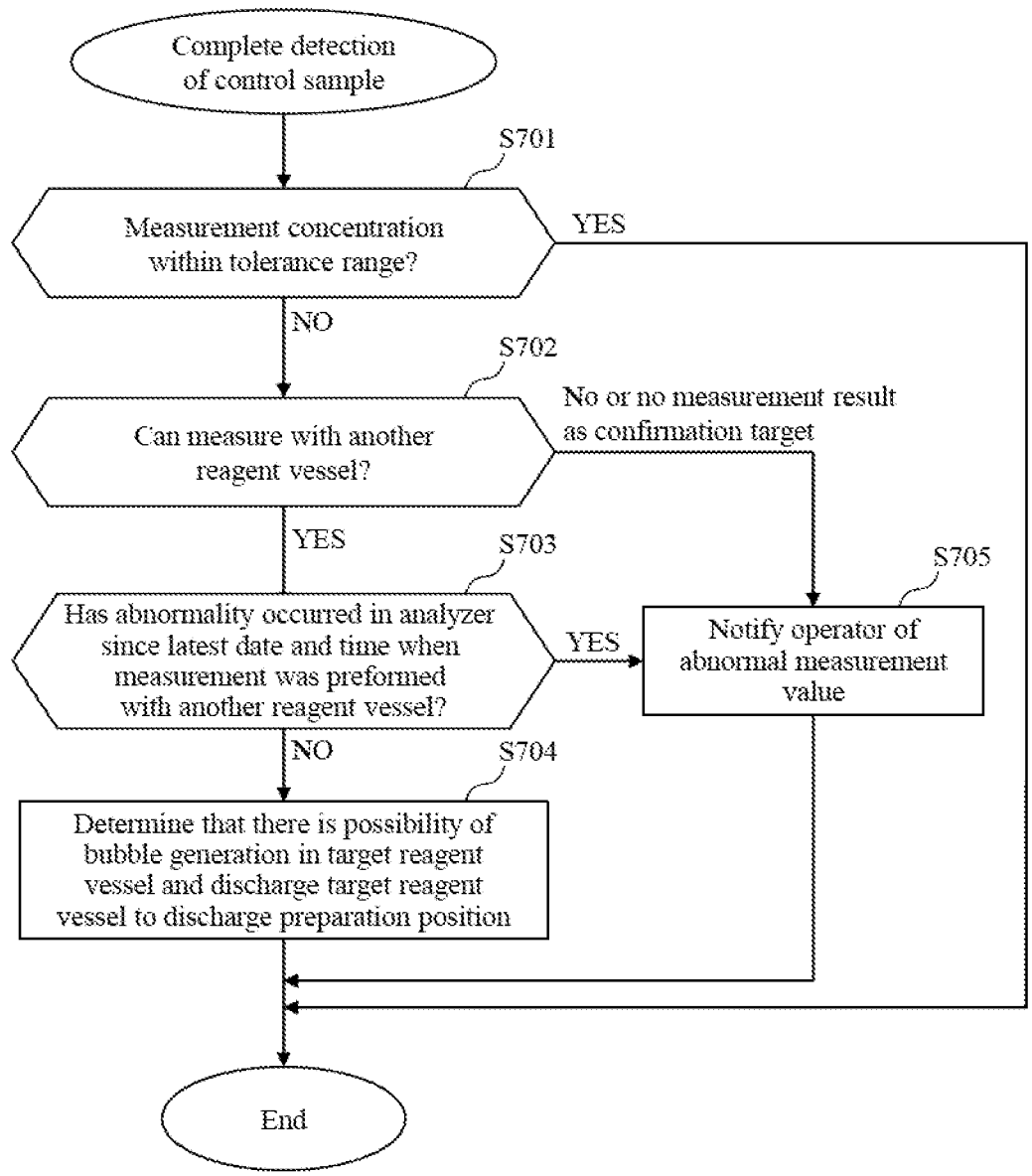
FIG. 7 is a flowchart for describing details of accuracy management processing of the analysis module by the determination unit.

FIG. 7 is a flow chart for describing details of the quality control processing of the analysis module 20 by the determination unit 11. The quality control processing can be performed by the determination unit 11, for example, at a timing of finishing the measurement of one item as for one control sample. The determination unit 11 determines whether a bubble is generated in the reagent vessel, based on the information of the measurement concentration data table 400, the control sample assignment information table 500, and the warning data table 600 stored in the storage unit 12. In this embodiment, the quality control processing will be described, by way of example, using the case of finishing the measurement of the measurement item "XXX" as for the "control sample X" contained in the "reagent vessel X" and storing the information 408 thereof in the measurement concentration data table 400. Here, since the quality control processing can be realized by a computer program, the determination unit 11 corresponding to the processor defines each step as an operation subject; however, the processing of each step or the processing of several steps may be modularized and the corresponding module may be defined as the operation subject.

Further, although as an example of the abnormality in the reagent vessel, whether a bubble is generated in the reagent vessel or not is described, deterioration of the reagent can be defined as the abnormality in the reagent vessel.

(i) Step 701

The determination unit 11 obtains the measurement concentration "20" of the measurement item "XXX" of the "control sample X", from the measurement concentration 405 in the measurement concentration data table 400. Then, the determination unit 11 confirms whether the obtained measurement concentration (concentration value 20) is within the tolerance range defined by the tolerance lower limit 504 and the tolerance upper limit 505 in the control sample assignment information table 500. When the measurement concentration is within the tolerance range (YES in Step 701), the above determines "no abnormality", and finishes the quality control processing. On the other hand, when the measurement concentration is out of the tolerance range (NO in Step 701), the above moves the processing to Step 702. For example, in the control sample assignment information table 500, the tolerance lower limit 504 of the measurement item "XXX" as for the "control sample X" is "90" and the tolerance upper limit 505 thereof is "100"; as the result, the measurement concentration "20" is out of the tolerance range. Therefore, the determination unit 11 executes Step 702.

(ii) Step 702

Figure 8:
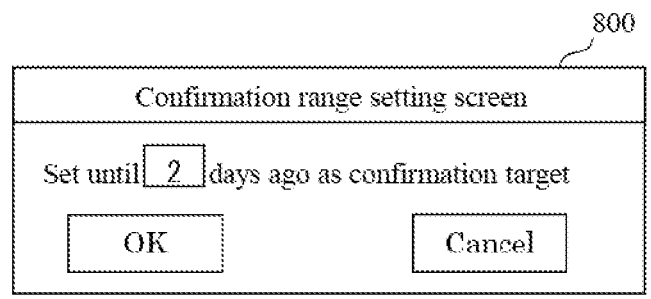
FIG. 8 is a diagram showing a configuration example of a screen that sets a range of a measurement result confirmed in step 702 in FIG. 7.

The determination unit 11 confirms whether the measurement concentrations of the control samples using the other reagent vessels than the "reagent vessel X" is normal, in short, whether the measurement concentrations of the control samples are respectively within the tolerance range set in the control sample assignment information table 500, in order to confirm whether the detection unit 21 has a problem. At this time, the control sample with the bubble influence 406 of "YES" in the measurement concentration data table 400 is removed from the object to be confirmed. It is because this case means a problem of the reagent vessel, not a problem of the detection unit 21. A user can set a range of how long period to be confirmed (for example, whether to confirm the measurement concentrations one day before or two days before) using a confirmation range setting screen 800 of FIG. 8. FIG. 8 shows an example of confirming the measurement concentrations two days before, set by an operation.

When the determination unit 11 determines that the measurement concentrations of the control samples using the other reagent vessels (for example, the reagent vessels other than the "reagent vessel X") are normal (YES in Step 702), it moves the processing to Step 703. When the above determines that some of the measurement concentrations of the control samples using the other reagent vessels (for example, the reagent vessels other than the "reagent vessel X") is abnormal (NO in Step 702), it moves the processing to Step 705. Further, when there is no measurement result of the object to be confirmed, it also moves the processing to Step 705.

In this embodiment, since the measurement concentrations of all the objects to be confirmed in the measurement concentration data table 400 are within the tolerance range, the processing is moved to Step 703.

By executing the processing in Steps 702 and 703, it is confirmed that no abnormality has occurred, except in the reagent vessel X.

(iii) Step 703

The determination unit 11 confirms whether an abnormality has occurred in the analysis module 20 since the normal measurement date and time, with reference to the warning data table 600. Here, an alarm of a bubble detection in the reagent vessel is excluded from the objects to be confirmed. When the alarm of a bubble detected in a specified reagent vessel is included in the objects to be confirmed, the bubble generation cannot be distinguished from the other abnormality (for example, abnormality of the device itself such as abnormality of a sensor) and the processing will be moved to Step 705. In other words, it is necessary to detect a problem, separating the case of the bubble generation from the other causes.

When the determination unit 11 determines that an abnormality has occurred in the analysis module 20 since the normal measurement date and time (YES in Step 703), it moves the processing to Step 705. When the above determines that no abnormality has occurred in the analysis module 20 since the normal measurement data and time (NO in Step 703), it moves the processing to Step 704.

In this embodiment, the measurement concentration data table 400 shows the last normal measurement date and time at 12:00 on Jan. 3, 2019. Further, the warning data table 600 shows the last alarm issuing at 9:30 on Jan. 1, 2019, except for the alarm of the bubble detection. The determination unit 11 determines that no abnormality has occurred in the analysis module 20 since the measured date and time, and it moves the processing to Step 704.

(iv) Step 704

The determination unit 11 determines that the analysis module 20 has no problem and that a bubble may be generated in a target reagent vessel, and discharges the same reagent vessel to the discharge preparation position. In short, in the case of the above example, the determination unit 11 determines that the analysis module 20 has no abnormality and that the bubble may be generated in the "reagent vessel X", and discharges the reagent vessel X to the discharge preparation position (the refrigerated reagent loader 220). The determination unit 11 stores the information of "bubble exists" in the bubble influence 406 of the measurement concentration data table 400 as for the measurement result of determining that there is a possibility of bubble generation.

(v) Step 705

When the other measurement concentration has an abnormality, the abnormality may occur due to any other cause than the bubble generation in the reagent vessel X. Therefore, the determination unit 11 notifies an operator of the abnormality in the measurement value (measurement concentration). Here, the notification may be made by an alarm display on a screen of the display unit or by an alarm sound such as buzzer.

Figure 9:
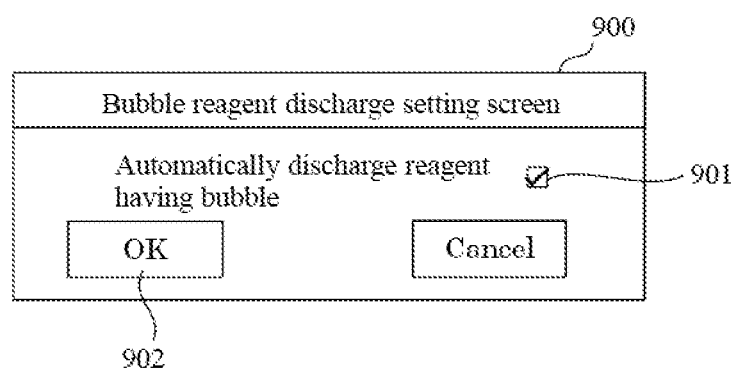
FIG. 9 is a diagram showing a configuration example of a bubble reagent discharge setting screen 900 that, when it is determined that "bubbles are generated" in a target reagent vessel, sets whether to automatically discharge the reagent vessel.

Reagent Discharge Setting (i) FIG. 9 is a view showing a configuration example of a bubble reagent discharge setting screen 900 for setting whether the corresponding reagent vessel is automatically discharged when the target reagent vessel is determined as "bubble exists".

By an operator's entering a check to a check item box 901 and pushing the OK button 902, the reagent vessel determined as "bubble exists" can be automatically discharged. In other words, when determining the target reagent vessel as "bubble exists", the determination unit 11 automatically discharges the corresponding reagent vessel, in reply to the check entered in the check item box 901.

On the other hand, when no check is entered in the check item box 901, the determination unit 11 displays the screen shown in FIG. 10 described later, waiting for an operator's input of instruction.

Figure 10:
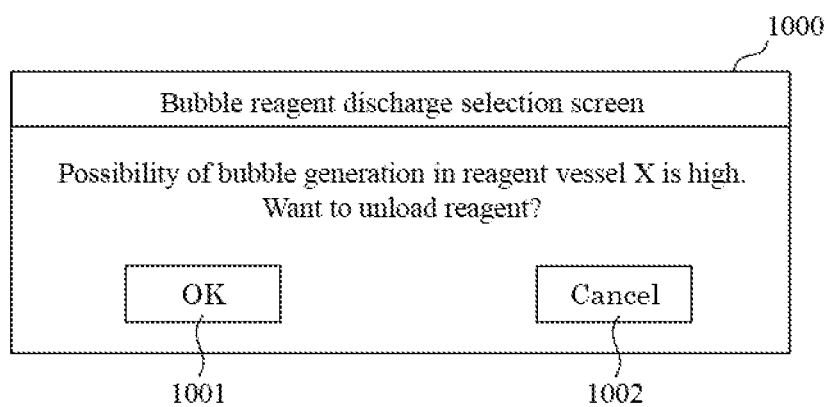
FIG. 10 is a diagram showing a configuration example of a bubble reagent discharge selection screen 1000 that inquires an operator whether to discharge the reagent vessel determined that "bubbles are generated".

(ii) FIG. 10 is a view showing a configuration example of a bubble reagent discharge selection screen 1000 for inquiring of an operator about whether the reagent vessel determined as "bubble exists" is discharged. The bubble reagent discharge selection screen 1000 is a screen displayed when no check is entered in the check item box 901, at the timing when the determination unit 11 detects a possibility of bubble generation in the target reagent vessel, as mentioned above.

When the bubble reagent discharge selection screen 1000 is displayed and an operator pushes the OK button 1001, the reagent vessel determined as "high possibility of bubble generation" by the determination unit 11 is discharged. On the other hand, when an operator pushes the Cancel button 1002, the reagent vessel determined as "high possibility of bubble generation" by the determination unit 11 is not discharged and kept in the reagent disk 211.

Distinguishment between Reagent Deterioration and Bubble Generation by Comparison with Previous Measurement Concentration An in-reagent vessel cause threshold table 1100 of FIG. 11 is added and Step 704 is replaced with the processing of FIG. 12, which can further improve the accuracy of the bubble detection.

Configuration Example of In-Reagent Vessel Cause Threshold Table

FIG. 11 is a view showing a configuration example of an in-reagent vessel cause threshold table for storing a reagent degradation threshold and a bubble generation threshold which are assigned to the respective sets of the control samples and the measurement items.

The in-reagent vessel cause threshold table 1100 includes a control sample 1101 showing a type of a control sample, a measurement item 1102, a reagent degradation threshold 1103 for identifying whether the measurement concentration abnormality is caused by the reagent degradation, a bubble generation threshold 1104 for identifying whether the measurement concentration abnormality is caused by the bubble generation, and a previous effective measurement value 1105, as the component items.

The cause of the abnormality of the measurement concentration is determined by whether a difference between the previous measurement concentration and the current measurement concentration exceeds the reagent degradation threshold 1103 and the bubble generation threshold 1104. When the difference between the current measurement concentration and the previous measurement concentration does not exceed the reagent degradation threshold 1103, the determination unit 11 determines that there is not a distinguishable difference and that there is a possibility of both the reagent degradation and the bubble generation.

For example, the reagent degradation threshold 1103 of the measurement item "AAA" as for the "control sample a" is set at "the previous measurement value ±25" and the bubble generation threshold is set at "the previous measurement value ±30". Therefore, when −25≤(the current measurement concentration−the previous measurement concentration)≤25, the determination unit 11 determines that there is no distinguishable difference and that there is a possibility of both the reagent degradation and the bubble generation. Further, when −30≤(the current measurement concentration−the previous measurement concentration)<−25 or 25<(the current measurement concentration−the previous measurement concentration)≤30, it determines that there is a possibility of the reagent degradation. Further, when −30>(the current measurement concentration−the previous measurement concentration) or 30<(the current measurement concentration−the previous measurement concentration), it determines that a bubble is generated in the reagent vessel.

In the embodiment, since the measurement concentration is much more influenced by the bubble generation than the reagent degradation, the reagent degradation threshold 1103 is nested in the bubble generation threshold 1104. When the reagent degradation is serious because a reagent is exposed to a room temperature for a long time and the like, the reagent degradation influences much more on the measurement concentration than the bubble generation and the above nest relation may be broken. Therefore, the effective previous measurement value 1105 is set. The measurement value exceeding the period of the effective previous measurement value 1105 is not used since the nest relation may be broken.

For example, when determining the reagent degradation and the bubble generation with respect to the "measurement item CCC" of the "control sample c" measured at 12:00 on Jan. 3, 2019, in the measurement concentration data table 400, the effective previous measurement value 1105 of the "measurement item CCC" of the "control sample c" is within one day and therefore, the previous value later than at 12:00, Jan. 2, 2019 is used.

Details of Determination Processing of Reagent Degradation and Bubble Generation by Comparison with Previous Measurement Concentration FIG. 12 is a flow chart for describing details of the processing, as for a reagent vessel determined to have an abnormality, for determining whether the abnormality is caused by the bubble within the reagent vessel or the reagent degradation. In this processing, a possibility of the bubble generation within the reagent vessel and a possibility of the reagent degradation are determined, based on the information of the measurement concentration data table 400 and the in-reagent vessel cause threshold table 1100 stored in the storage unit 12.

(i) Step 1201

The determination unit 11 determines whether the measurement concentration of the same measurement item of the same sample exists in the past. Since the measurement value in the past is used to distinguish the reagent degradation from the bubble generation, when the same concentration does not exist, the above unit determines that it impossible to distinguish the bubble generation and the reagent degradation and moves the processing to Step 1207. When the same concentration exists, the above unit moves the processing to Step 1202.

In the embodiment, the determination unit 11 determines whether the measurement item "xxx" has been measured with the "control sample x" in the past. At first, the determination unit 11 obtains the effective previous measurement value 1105 of "within 12 hours" of the measurement item "xxx" of the "control sample x", from the in-reagent vessel cause threshold table 1100. The determination unit 11 obtains the measurement value in the past in the range within 12 hours from the current measurement date and time of 13:00 on Jan. 4, 2019. Since the measurement concentration data table 400 has the corresponding measurement concentration of "98" at 10:00 on Jan. 4, 2019, it moves the processing to Step 1202. When there is no relevant measurement concentration in the past, a threshold cannot be obtained and it moves the processing to Step 1207.

(ii) Step 1202

The determination unit 11 obtains a threshold for distinguishing the reagent degradation and the bubble generation from each other, from the in-reagent vessel cause threshold table 1100. When the in-reagent vessel cause threshold table 1100 does not have the corresponding combination of the control sample and measurement item, since a threshold cannot be obtained, the above determines that it impossible to distinguish the bubble generation and the reagent degradation from each other and moves the processing to Step 1207.

In the embodiment, the determination unit 11 obtains the reagent degradation threshold 1103 and the bubble generation threshold 1104 of the control sample "x" and the measurement item "xxx" from the in-reagent vessel cause threshold table 1100. It obtains the previous measurement threshold ±15 of the reagent degradation threshold 1103 and the previous value ±20 of the bubble generation threshold 1104 as for the measurement item "xxx" of the "control sample x" and moves the processing to Step 1203.

(iii) Step 1203

The determination unit 11 determines whether the reagent degradation and the bubble can be distinguished from each other according to the current measurement value. When the above value does not exceed the reagent degradation threshold 1103, in other words, when a difference between the current and the previous measurement concentration does not exceed the reagent degradation threshold, the above unit 11 determines that there is not such a difference in the measurement concentration as to distinguish the reagent degradation and the bubble from each other, and moves the processing to Step 1207. When the above value exceeds the reagent degradation threshold, it determines that there is such a difference in the measurement concentration as to distinguish the reagent degradation and the bubble from each other and moves the processing to Step 1204.

In the embodiment, the current measurement concentration is "20" and the previous measurement concentration is "98". Since the difference between the current and the previous measurement concentration is "−78", exceeding "−15" of the reagent degradation threshold 1103, the above unit 11 determines that there is such a difference in the measurement concentration as to distinguish the reagent degradation and the bubble from each other and moves the processing to Step 1204.

(iv) Step 1204

The determination unit 11 determines whether the abnormality of the current measurement concentration is caused by the reagent degradation or the bubble generation, according to the threshold obtained in Step 1202. When a difference between the current and the previous measurement concentration exceeds the reagent degradation threshold 1103 and not exceeds the bubble generation threshold 1104, the above determines that the reagent may be degraded and moves the processing to Step 1205. When the difference between the current and the previous measurement concentration exceeds the bubble generation threshold 1104, the above determines that a bubble may be generated in the reagent vessel and moves the processing to Step 1206.

In the embodiment, since the difference between the current and the previous measurement concentration exceeds "−78", exceeding the bubble generation threshold 1104, the determination unit 11 determines that a bubble may be generated and moves the processing to Step 1206.

(v) Step 1205

When determining in Step 1204 that the reagent may be degraded, the determination unit 11 notifies an operator of a reagent degradation possibility.

(vi) Step 1206

When determining that a bubble may be generated in the reagent vessel in Step 1204, the determination unit 11 notifies an operator of a bubble generation possibility.

(vii) Step 1207

When the determination unit 11 cannot obtain a threshold in Step 1202, or when it determines that the reagent degradation and the bubble cannot be distinguished from each other in Step 1203, the above notifies an operator of a possibility of the reagent degradation or the bubble generation. Here, it may notify an operation of which step the processing proceeds to and whether the threshold is not registered or a big difference does not occur.

Here, the notification in Steps 1205, 1206, and 1207 may be made by an alarm display on the screen of the display unit or by the alarm sound such as buzzer.

(viii) Step 1208

The determination unit 11 determines that the analysis module 20 has no problem but that the target reagent vessel has a problem, and discharges the same reagent vessel to the discharge preparation position.

<Example of Bubble Detection according to Change in Position of Reagent Liquid Surface Here, an in-reagent vessel liquid surface height table 1300 is added to replace the processing of Steps 1230, 1204, 1205, and 1206 with the processing of FIG. 14, hence to be able to build in a mechanism for detecting a bubble according to a change in the height of the reagent liquid surface.

Configuration Example of In-Reagent Vessel Liquid Surface Height Table

Figure 13:
FIG. 13 is a view showing a configuration example of the in-reagent vessel liquid surface height table 1300 for storing the liquid surface height in each reagent vessel.

FIG. 13 is a view showing a configuration example of the in-reagent vessel liquid surface height table 1300 for storing the liquid surface height in each reagent vessel.

The in-reagent vessel liquid surface height table 1300 includes a reagent vessel 1301 and a current reagent liquid surface height 1302 of the same reagent vessel as the component items.

The liquid surface height 1302 is obtained according to a fall amount of the reagent dispensing nozzle 213 and the aspirated amount when aspirating a reagent, and a bottle size.

By comparison of the liquid surface height, a bubble generation can be detected. For example, when liquid surface containing a bubble is detected at the reagent aspiration, the fall amount of the reagent dispensing nozzle 213 gets smaller and the calculated liquid surface height gets higher than the previous liquid surface height. According to this, it can be determined that a bubble has been generated.

Further, by comparison of the liquid surface height, disappearance of a bubble can be detected. For example, when the previous liquid surface height is calculated in a state containing a bubble and then in the current reagent dispensation, the bubble disappears, the liquid surface height gets lower than the assumed one.

A threshold of a change in the liquid surface height for distinguishing the bubble generation or the bubble disappearance may be set by an operator from the overall management computer 10, or a fixed value thereof may be previously set in the storing unit 12 by a product designer.

Details of Bubble Detection Processing by Change of Position of Reagent Liquid Surface FIG. 14 is a flow chart for describing the processing in which a mechanism for detecting a bubble according to a change of the reagent liquid surface height and a mechanism for determining the reagent degradation from the reagent degradation threshold are combined together. This processing is to determine a possibility of a bubble generation or bubble disappearance in the reagent vessel and a possibility of the reagent degradation, based on the information of the in-reagent vessel cause threshold table 1100 and the in-reagent vessel liquid surface height table 1300 stored in the storage unit 12.

(i) Step 1401

The determination unit 11 calculates the liquid surface height, according to the amount of the reagent dispensing nozzle 213 falling in the current reagent aspiration and the shape of the reagent vessel. The above unit compares the calculated liquid surface height with the previous liquid surface height 1302 recorded in the in-reagent vessel liquid surface height table 1300. As the result of the comparison, when the currently calculated liquid surface height is greater than the previously calculated liquid surface height, the above unit determines that a bubble may be generated and moves the processing to Step 1402. When the currently calculated liquid surface height is smaller than the previously calculated liquid surface height, it determines that the bubble may disappear and moves the processing to Step 1403. When there is no difference between the currently calculated liquid surface height and the previously calculated liquid surface height, it determines that no bubble may be generated nor disappear, and moves the processing to Step 1404.

In the embodiment, when the threshold of the change in the liquid surface height for identifying the bubble generation is set at "2 mm" and the threshold of the change in the liquid surface height for identifying the bubble disappearance is set at "−4 mm", the determination unit 11 determines that a bubble has been generated in the case of the liquid surface height of the currently calculated "reagent vessel X" greater than "2 mm", that a bubble has disappeared in the case of the above height smaller than "−4 mm", and that no bubble may be generated nor disappear in the case of "−4 mm and more, 2 mm and less".

(ii) Step 1402

When determining that a bubble may be generated in Step 1401, the determination unit 11 notifies an operation of a reagent degradation possibility and moves the processing to Step 1407.

(i) Step 1403

When determining that a bubble may disappear in Step 1401, the determination unit 11 notifies an operator of a bubble disappearance possibility and moves the processing to Step 1407.

When determining that the bubble may disappear, the above unit may also notify an operator of the previous measurement result obtained by using the corresponding reagent vessel.

(i) Step 1404

When determining that no bubble may be generated nor disappear in Step 1401, the determination unit 11 confirms whether a difference between the previous and the current measurement concentration exceeds the threshold of the reagent degradation. When it exceeds the threshold of the reagent degradation, the above unit moves the processing to Step 1405. When it is smaller than the threshold of the reagent degradation, the above determines that the set threshold cannot solve the cause of the abnormality of the measurement concentration, whether by a bubble or the reagent degradation, and moves the processing to Step 1406.

(i) Step 1405

When determining that the reagent may be degraded in Step 1404, the determination unit 11 notifies an operator that the reagent may be degraded in the target reagent vessel.

(i) Step 1406

When the difference between the previous and the current measurement concentration is smaller than the threshold of the reagent degradation in Step 1404, the determination unit 11 notifies an operation that it cannot determine whether the abnormality of the measurement concentration has been caused by a bubble or the reagent degradation.

(i) Step 1407

The determination unit 11 determines that the analysis module 20 has no problem but that the target reagent vessel has a problem and discharges the same reagent vessel to the discharge preparation position.

Here, the notification in Steps 1402, 1403, 1405, and 1406 may be made by an alarm display on the screen of the display unit or by an alarm sound such as buzzer.

SUMMARY (i) According to the embodiment, in the automatic analyzer, based on a type of a sample (for example, various types of control samples), the concentration-related information relative to a concentration of the component to be measured included in the sample, which is determined for each type of the sample, and the concentration of the component to be measured contained in a reaction liquid (by comparison between the above two information), whether or not an abnormality occurs in the reagent vessel (a bubble generation in the reagent vessel and a degradation of the reagent itself in the reagent vessel) is determined. According to this, when the measurement result of the quality control becomes abnormal, whether the reagent has a problem or not is detected and the reagent having the problem is automatically discharged, which facilitates an operator's cause investigation work.

Specifically, the above concentration-related information indicates the tolerance range of the concentration of the above component to be measured, which is set to determine whether a bubble is generated in the reagent vessel. Then, the determination unit (processor) determines whether the bubble is generated in the reagent vessel or whether the reagent is degraded, based on the comparison result of whether the measurement concentration is included in the tolerance range. As mentioned above, according to the embodiment, only by determining whether the measurement concentration is within a proper range, the abnormality of the reagent can be detected. In short, by the comparatively simple processing, whether the abnormality has occurred or not in the reagent can be detected.

Further, when determining that the abnormality has occurred in the reagent vessel, the determination unit controls the moving unit to move the reagent vessel to the discharge preparation position (the position where the reagent vessels are refrigerated), in reply to the instruction (automatic discharge instruction, or discharge instruction properly made by an operation). As mentioned above, by discharging the reagent vessel determined to have the abnormality to the position of refrigeration, the reagent degradation can be avoided according to a temperature change and an operator can confirm the discharged reagent vessel at a favorable timing. Further, when the abnormality is caused by the bubble in the reagent vessel, the reagent vessel having a highest possibility of the bubble generation is discharged, hence to make it possible to reduce the anxiety of incorrect result by the bubble and to improve the reliability of the measurement results.

Further, whether the abnormality in the reagent vessel is caused by the bubble in the reagent vessel or the degradation of the reagent itself included in the reagent vessel is determined by comparison between the previous measurement concentration and the measurement concentration exceeding the tolerance range. As mentioned above, the cause of the abnormality in the reagent vessel is more specifically determined, which facilitates the operator's cause investigation work.

Further, the invention can determine the cause of the abnormality in the reagent vessel more specifically, also by the combination with the bubble detection according to a change in the reagent liquid surface in the reagent vessel.

(ii) The functions of the embodiment can be also realized by the program codes of software. In this case, the storing medium with the program codes recorded there is provided to a system or a device and the computer (or CPU or MPU) of the system or the device reads the program codes stored in the storing medium. In this case, the program codes themselves read from the storing medium realize the above-mentioned functions of the embodiment, and the program codes themselves and the storing medium with the same codes recorded there are to form this disclosure. As the storing medium for supplying these program codes, for example, a flexible disk, a CD-ROM, a DVD-ROM, a hard disk, an optical disk, an optical magnetic disk, a CD-R, a magnetic tape, a non-volatile memory card, and a ROM are used.

Further, based on the instruction of the program codes, OS (operating system) working on the computer performs a part or the whole of the actual processing, and by the above processing, the above-mentioned functions of the embodiment may be realized. Further, after the program codes read from the storing medium are written in a memory on the computer, the CPU of the computer and the like may perform a part or the whole of the actual processing, based on the instruction of the program codes, and by the above processing, the above-mentioned functions of the embodiment may be realized.

Further, by delivering the program codes of the software for realizing the functions of the embodiment through a network, the above may be stored in a recording means such as a hard disk or a memory of the system or the device, or a storing medium such as CD-RW, CD-R, and the like, and when using the above, the computer (or CPU or MPU) of the system or the device may read the program codes stored in the recording means and the storing medium to execute the above.

The process and the technique described here is not to be related to any specified device essentially. Further, various types of devices for the general purpose can utilize the above according to the description of the disclosure. Here, in order to execute the technique of the disclosure, construction of a device for the exclusive use may be effective in some cases.

Various inventions can be formed by a proper combination of the several components disclosed in the embodiment. For example, some components may be deleted from the whole components shown in the embodiment. Further, the components in various embodiments may be properly combined. The technique of the disclosure has been described in relative to the concrete embodiment; however, this is not to restrict the technique of the disclosure but for the description. Those skilled in this field will understand there may be lots of proper combinations of hardware, software, and firmware to perform the technique of the disclosure. For example, the described software can be installed in a wide range of program or script language such as assembler, C/C++, perl, Shell, PHP, Java (registered trademark), and the like.

Further, in the above-mentioned embodiment, as for the control lines and the information lines, those lines considered necessary for the description are shown and all the control lines and the information lines are not always shown on the product. All the components may be mutually connected.

REFERENCE SIGN LIST 1 automatic analyzer
11 determination unit
12 storage unit
10 overall management computer
20 analysis module
21 detection unit
22 moving unit
23 reagent dispensing unit
24 abnormality detection unit
201 transport rack
202 sample vessel
203 sample dispensing nozzle
204 incubator
205 reaction vessel
206 sample dispensing tip and reaction vessel transport mechanism
207 sample dispensing tip and reaction vessel holding member
208 reaction vessel stirring mechanism
209 sample dispensing tip and reaction vessel disposal hole
210 sample dispensing tip mounting position
211 reagent disk
212 reagent disk cover
213 reagent dispensing nozzle
214 reaction solution aspiration nozzle
215 detection unit
216 rack transport line
217 reagent vessel
218 bubble detection camera for sample
219 reagent stirring mechanism (magnetic particle stirring mechanism)
220 reagent loader
221 reagent information reading mechanism

The invention claimed is:

1. An automatic analyzer comprising:
a reagent dispensing unit configured to aspirate a reagent from a reagent vessel that contains the reagent, and discharge the reagent into a reaction vessel that contains a reaction liquid containing a sample;
a storage unit configured to store a type of the sample and concentration-related information determined for each type of the sample, the concentration-related information including a tolerance range, a reagent degradation threshold, and a bubble generation threshold for a concentration of a component to be measured contained in the sample;
a detection unit configured to detect a measurement concentration that is a concentration of the component to be measured contained in the reaction liquid; and
a determination unit configured to determine whether an abnormality occurs in the reagent vessel based on whether the measurement concentration in a current measurement is within the tolerance range, the abnormality indicating that either a bubble is generated in the reagent vessel or there is a possibility of deterioration of the reagent contained in the reagent vessel, wherein
the determination unit determines that a bubble is generated in the reagent vessel in a case in which an absolute value of a difference between the measurement concentration in a previous measurement and the measurement concentration in the current measurement is above the bubble generation threshold, and
the determination unit determines that there is a possibility of deterioration of the reagent contained in the reagent vessel in a case in which the absolute value of the difference between the measurement concentration in the previous measurement and the measurement concentration in the current measurement is greater than the reagent degradation threshold and equal to or less than the bubble generation threshold.

2. The automatic analyzer according to claim 1, wherein
the storage unit stores the type of the sample, measurement time when the component to be measured is measured, and the measurement concentration detected at the measurement time in association with each other, and
the determination unit determines that a bubble exists in the reagent vessel when the measurement concentration in a previous measurement is within in the tolerance range.

3. The automatic analyzer according to claim 1, wherein when the determination unit determines that an abnormality has occurred in the reagent vessel, a moving unit is controlled to move the reagent vessel to a discharge preparation position in response to an instruction.

4. The automatic analyzer according to claim 1, wherein when the determination unit determines that an abnormality has occurred in the reagent vessel, a display device is controlled to display a screen for selecting whether to move the reagent vessel to the discharge preparation position on a display screen.

5. The automatic analyzer according to claim 1, wherein when the determination unit determines that there is a possibility of an abnormality other than the abnormality in the reagent vessel, the possibility of the abnormality is output to outside.

6. An automatic analyzer comprising:
a reagent dispensing unit configured to aspirate a reagent from a reagent vessel that contains the reagent, and discharge the reagent into a reaction vessel that contains a reaction liquid containing a sample;
a storage unit configured to store a type of the sample and concentration-related information determined for each type of the sample, the concentration-related information including a tolerance range, a reagent degradation threshold, and a bubble generation threshold for a concentration of a component to be measured contained in the sample a concentration of a component to be measured contained in the sample;
a detection unit configured to detect a measurement concentration that is a concentration of the component to be measured contained in the reaction liquid; and
a determination unit configured to determine whether an abnormality occurs in the reagent vessel based whether the measurement concentration in a current measurement is within the tolerance range, the abnormality indicating that either a bubble is generated in the reagent vessel or there is a possibility of deterioration of the reagent contained in the reagent vessel, wherein
when an absolute value of a difference between the measurement concentration in a previous measurement and the measurement concentration in a current measurement is equal to or less than the reagent degradation threshold value, the determination unit determines that there are possibilities of deterioration of the reagent contained in the reagent vessel and of a bubble generation in the regent vessel.

7. The automatic analyzer according to claim 6, wherein when the absolute value of the difference between the measurement concentration in the previous measurement and the measurement concentration in the current measurement is more than the reagent degradation threshold value and equal to or less than the bubble generation threshold value, the determination unit determines that there is a possibility of deterioration of the reagent contained in the reagent vessel.

8. The automatic analyzer according to claim 7, wherein when the absolute value of the difference between the measurement concentration in the previous measurement and the measurement concentration in the current measurement is more than the bubble generation threshold value, the determination unit determines that there is a possibility of deterioration of the reagent contained in the reagent vessel.

9. The automatic analyzer according to claim 6, wherein when the determination unit determines that an abnormality has occurred in the reagent vessel, a moving unit is controlled to move the reagent vessel to a discharge preparation position in response to an instruction.

10. The automatic analyzer according to claim 6, wherein when the determination unit determines that an abnormality has occurred in the reagent vessel, a display device is controlled to display a screen for selecting whether to move the reagent vessel to the discharge preparation position on a display screen.

11. An abnormality detection method comprising:
detecting, by a detection unit, a concentration of a component to be measured contained in a reaction liquid containing a sample and a reagent aspirated from a reagent vessel;
acquiring, by a determination unit, from a storage unit, a type of the sample and concentration-related information determined for each type of the sample, the concentration-related information including a tolerance range, a reagent degradation threshold, and a bubble generation threshold for the concentration of the component to be measured contained in the sample; and
determining, by the determination unit, whether an abnormality occurs in the reagent vessel based on whether the measurement concentration in a current measurement is within the tolerance range, the abnormality indicating that either a bubble is generated in the reagent vessel or there is a possibility of deterioration of the reagent contained in the reagent vessel, wherein
the determination unit determines that a bubble is generated in the reagent vessel in a case in which an absolute value of a difference between the measurement concentration in a previous measurement and the measurement concentration in the current measurement is above the bubble generation threshold, and
the determination unit determines that there is a possibility of deterioration of the reagent contained in the reagent vessel in a case in which the absolute value of the difference between the measurement concentration in the previous measurement and the measurement concentration in the current measurement is greater than the reagent degradation threshold and equal to or less than the bubble generation threshold.

12. An abnormality detection method comprising:
aspirating, by a reagent dispensing unit, a reagent from a reagent vessel that contains the reagent, and discharging the reagent into a reaction vessel that contains a reaction liquid containing a sample;
detecting, by a detection unit, a measurement concentration that is a concentration of the component to be measured contained in the reaction liquid;
reading, by a determination unit, from a storage unit storing a type of the sample and concentration-related information determined for each type of the sample, the concentration-related information including a tolerance range, a reagent degradation threshold, and a bubble generation threshold for a concentration of a component to be measured contained in the sample; and
determining, by the determination unit, whether an abnormality occurs in the reagent vessel based on whether the measurement concentration in a current measurement is within the tolerance range, the abnormality indicating that either a bubble is generated in the reagent vessel or there is a possibility of deterioration of the reagent contained in the reagent vessel, wherein
when an absolute value of a difference between the measurement concentration in a previous measurement and the measurement concentration in the current measurement is equal to or less than the reagent degradation threshold value, the determination unit determines that there are possibilities of deterioration of the reagent contained in the reagent vessel and of a bubble generation in the regent vessel.

13. The automatic analyzer according to claim 1, wherein the determination unit determines that the abnormality is both the generation of a bubble in the reagent vessel and the possibility of deterioration of the reagent contained in the reagent vessel in a case in which the absolute value of the difference between the measurement concentration in the previous measurement and the measurement concentration in the current measurement is less than or equal to the reagent degradation threshold.

* * * * *